(12) United States Patent
Arslan et al.

(10) Patent No.: US 12,250,157 B2
(45) Date of Patent: Mar. 11, 2025

(54) NETWORK CONGESTION CONTROL IN SUB-ROUND TRIP TIME

(71) Applicant: Google LLC, Mountain View, CA (US)

(72) Inventors: Serhat Arslan, Stanford, CA (US); Yuliang Li, Sunnyvale, CA (US); Gautam Kumar, Fremont, CA (US); Nandita Dukkipati, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 18/136,551

(22) Filed: Apr. 19, 2023

(65) Prior Publication Data

US 2023/0336490 A1    Oct. 19, 2023

Related U.S. Application Data

(60) Provisional application No. 63/332,536, filed on Apr. 19, 2022.

(51) Int. Cl.
| | |
|---|---|
| *H04L 47/27* | (2022.01) |
| *H04L 47/12* | (2022.01) |
| *H04L 47/215* | (2022.01) |
| *H04L 47/30* | (2022.01) |

(52) U.S. Cl.
CPC .............. *H04L 47/27* (2013.01); *H04L 47/12* (2013.01); *H04L 47/215* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 7,369,498 B1 | 5/2008 | Ma et al. | |
| 7,701,853 B2 | 4/2010 | Malhotra et al. | |
| 8,681,610 B1 | 3/2014 | Mukerji | |
| 8,750,370 B2 * | 6/2014 | Nagapudi | H04L 47/263 375/240.03 |
| 8,948,009 B1 * | 2/2015 | Hasan | H04L 47/193 370/231 |
| 2010/0306408 A1 * | 12/2010 | Greenberg | H04L 12/4633 709/245 |

(Continued)

OTHER PUBLICATIONS

Extended European Search Report for European Patent Application No. 23168706.2 dated Aug. 31, 2023. 16 pages.

*Primary Examiner* — Quang N Nguyen

(74) *Attorney, Agent, or Firm* — Lerner David LLP

(57) ABSTRACT

Aspects of the disclosure provide for congestion control mechanisms to reduce data transmission queues and to increase link utilization through precise congestion signals and reduction of control loop delay. A congestion control system (CC) system can utilize Back-To-Sender (BTS) packets over (round trip time) RTT control loop delay to react to congestion faster. The CC system can apply Proactive Ramp-up (PRU) to identify flow completions to occupy released bandwidth right on time, e.g., as bandwidth is made available. The CC system can perform supply matching (SM) through network calculus concepts to increase link utilization. The CC system can apply some or all of the use of BTS packets, PRU, and/or SM to reduce network latency and improve data flow completion time as compared with other approaches.

13 Claims, 9 Drawing Sheets

(56) References Cited

U.S. PATENT DOCUMENTS

| | | | |
|---|---|---|---|
| 2012/0063493 A1* | 3/2012 | Hasegawa | H04L 47/724 |
| | | | 375/296 |
| 2014/0016461 A1* | 1/2014 | Ishikawa | H04L 47/35 |
| | | | 370/230 |
| 2015/0029853 A1* | 1/2015 | Raindel | H04L 12/4633 |
| | | | 370/235 |
| 2016/0269305 A1* | 9/2016 | Sreeramoju | H04L 47/30 |
| 2022/0311711 A1* | 9/2022 | Jepsen | H04L 47/27 |

* cited by examiner

NETWORK CONGESTION CONTROL IN SUB-ROUND TRIP TIME

CROSS-REFERENCE TO RELATED APPLICATIONS

The present application claims the benefit of the filing date of U.S. Provisional Application No. 63/332,536, filed on Apr. 19, 2022, the disclosure of which is hereby incorporated herein by reference.

BACKGROUND

Workloads in data centers are evolving towards parallel, lightweight applications that rely on telecommunications networks that can provide low latency with high bandwidth. Accordingly, application-level service level objectives (SLOs) are increasing, placing increased reliance on the performance of the network.

Congestion control ("CC") refers to a mechanism implemented by devices in a network for monitoring network traffic, identifying congestion events, such as network bottlenecks, and causing sender devices which send data to a network location experiencing a congestion event to perform some action in response to the congestion. For example, the sender devices can slow down or halt sending data until the congestion event resolves.

Line rates within networks are increasing, with 100 Gbps (gigabit per second) links becoming abundant and 200 and 400 Gbps links gaining increased adoption. Higher line rates increase traffic burstiness as more flows fit within a Bandwidth-Delay-Product (BDP). The Bandwidth Delay Product is the product of one or more links's capacity and its round-trip delay time. This increase also puts more pressure on congestion control mechanisms of a network to maintain high link utilization and zero or near-zero packet queues. For example, the fraction of Remote Procedure Calls that fit within a single BDP can increase by 18% or more in some datacenters when the one or more links rate is increased from 100 Gbps to 400 Gbps. Congestion Control mechanisms in these datacenters are expected to converge to stable allocations at round trip time (RTT) times.

However, these mechanisms cannot manage messages smaller than a BDP when the response is delayed by an entire RTT. In these cases, a sender device can send the entire sub BDP-sized message at once and risk whether the network is capable of delivering the message with zero queue time to meet an ideal flow-completion-time (FCT), e.g., the time required to complete a flow through a network. Meanwhile, throughput is the main contributor to FCT for long flows, so congestion control mechanisms should attempt to fully utilize available links. Therefore, even a single incorrect CC decision by a congestion control system can create tens of microseconds or more of queuing and/or cause under-utilization of link capacity over the course of multiple RTTs.

BRIEF SUMMARY

Aspects of the disclosure provide for congestion control mechanisms to reduce data transmission queues and to increase link utilization through precise congestion signals and reduction of control loop delay. A congestion control system (CC) can utilize Back-To-Sender (BTS) packets instead of (round trip time) RTT control loop delay to react to congestion faster. The CC system can apply Proactive Ramp-up (PRU) to identify flow completions to occupy released bandwidth right on time, e.g., as bandwidth is made available. The CC system can perform supply matching (SM) to increase link utilization by identifying mismatches between bandwidth "supply" and "demand" at a network switch. The CC system can apply some or all of the use of BTS-based packets, PRU, and/or SM to reduce network latency and improve data flow completion time as compared with other approaches.

Aspects of the disclosure provide for a method for congestion control on a network of, the method including: sending, by a sender node including one or more processors, one or more data packets to a receiver node along one or more links; receiving, by the sender node, a congestion notification generated by a switch along the one or more links; calculating the time between sending the one or more data packets and receiving the congestion notification from the switch; and adjusting, by the sender node and within the calculated time, a congestion window for a connection between the sender node and the receiver node used to send the one or more data packets.

Aspects of the disclosure provide for a method of congestion control on a network, the method including: maintaining, by a switch including one or more processors, a count of zero or more tokens corresponding to available bandwidth for one or more links including the switch; receiving, by the one or more processors, a data packet including a header with a set flag, the data packet received from a sender node to be transmitted to a receiver node along the one or more links; determining, by the one or more processors, whether the count of tokens is positive, in response to determining that the count of tokens is positive, decrement the count of tokens, and in response to determining that the count of tokens is not positive, clearing the flag and increasing a congestion window for a connection between a sender node and the switch; and sending the data packet to a downstream node in the one or more links.

Aspects of the disclosure provide for a method for congestion control on a network, the method including: calculating, by a switch including one or more processors, a value corresponding to the difference between the number of bytes the switch can serialize in unit time and the number of bytes that arrived at a switch during the unit time; maintaining, by the switch and based on the calculated value corresponding to the difference, a supply token count, wherein a negative supply token count corresponds to packet queueing at the switch and a positive supply token count corresponds to under-utilization of the one or more links at the switch; determining that the difference between the numbers of bytes is less than one maximum transfer unit (MTU) for the one or more links, and in response, clearing a flag of the congestion notification sent to a sender node indicating a congestion event at a receiver node with which the sender node is communicating, the cleared flag causing the sender node to increment a congestion window for the connection when set.

Other aspects of the disclosure include a system including one or more processors of a switch and/or a sender node configured to perform a method according to aspects of the disclosure, as well one or more non-transitory computer readable media encoded with instructions, which when executed by one or more processors, cause the one or more processors to perform operations including methods for congestion control described herein.

The foregoing and other aspects of the disclosure can include one or more features, such as the following, in any combination. In some examples, aspects of the disclosure provide all of the following features together, in combination.

The calculated time is less than the roundtrip time for sending data and receiving an acknowledgment between the sender node and the receiver node.

The method further includes adjusting the congestion window for the connection only once per calculated time interval.

One or more data flows are transmitted along the one or more links, including a first flow including the one or more data packets sent by the sender node to the receiver node, and wherein the method further includes: calculating a factor measuring the proportion of the congestion to the one or more links that the first flow contributes over the total amount of congestion on the one or more links; receiving the current queue occupancy for a queue of data maintained at the switch; and adjust the congestion window based at least on the factor, the current queue occupancy, and the calculated time.

The method further includes generating a header for a data packet of a plurality of data packets, the header including a first flag indicating that the data packet is an initial data packet transmitted of the plurality of data packets, and further including data specifying the amount of data to be transferred in the plurality of data packets; and transmitting the plurality of data packets to the switch.

The data packet of the plurality of data packets is a first data packet, and wherein the method further includes: generating a header for a second data packet of the plurality of data packets, the header including a second flag indicating that the second data packet is the last packet of the plurality of data packets; and transmitting the second data packet.

The method further includes maintaining, by a switch the one or more processors, a count of zero or more tokens corresponding to available bandwidth for one or more links including the switch; receiving, by the switch, a data packet including a header with a set flag; determining, by the switch, whether the count of tokens is positive, in response to determining that the count of tokens is non-zero, decrement the count of tokens, and in response to determining that the count of tokens is zero, clearing the flag and increasing a congestion window for a connection between the sender node and the one or more processors; and sending the data packet to a downstream node in the one or more links.

The method further includes maintaining, by the switch, a count of packets received corresponding to a first flow of data over the connection; receiving, by the switch, a data transfer quantity indicating the total amount of data to transmit in the first flow; calculating, by the switch and based at least on the received data transfer quantity, an estimated time for the completion of the first flow; and at or after the estimated time for the completion of the first flow, increasing, by the switch, respective congestion windows for connections for one or more other flows along the one or more links different from the first flow.

The received data packets form part of a remote procedure call (RPC) from the sender node, and wherein the method further includes: receiving, by the switch, a flag in a header of a first packet of the received data packets indicating whether the first packet is an initial packet transmitted as part of the RPC, wherein the received data packets of the RPC are collectively smaller in size than a bandwidth delay product (BDP) for the one or more links; and increasing, by the switch, the count of tokens only when the flag indicating that the first packet is an initial packet is cleared.

The method further includes receiving, by the switch, a flag in a header of a second packet of the received data packets indicating that the second packet is the last packet transmitted of the RPC; and incrementing the count of tokens when the flag in the header of the second packet is set, otherwise decrementing the count of tokens.

The method further includes: calculating, by the switch, a value corresponding to the difference between the number of bytes the switch can serialize in unit time and the number of bytes that arrived at the switch during the unit time; maintaining, by the switch and based on the calculated value corresponding to the difference, a supply token count, wherein a negative supply token count corresponds to packet queueing at the switch and a positive supply token count corresponds to under-utilization of the one or more links at the switch; determining, by the switch, that the difference between the numbers of bytes is less than one maximum transfer unit (MTU) for the one or more links, and in response, clearing a flag of the congestion notification sent to the sender node, the cleared flag causing the sender node to increment a congestion window for the connection when set.

The method further includes decrementing the MTU of the one or more links from the supply token value.

DETAILED DESCRIPTION

Overview

Figure 1:
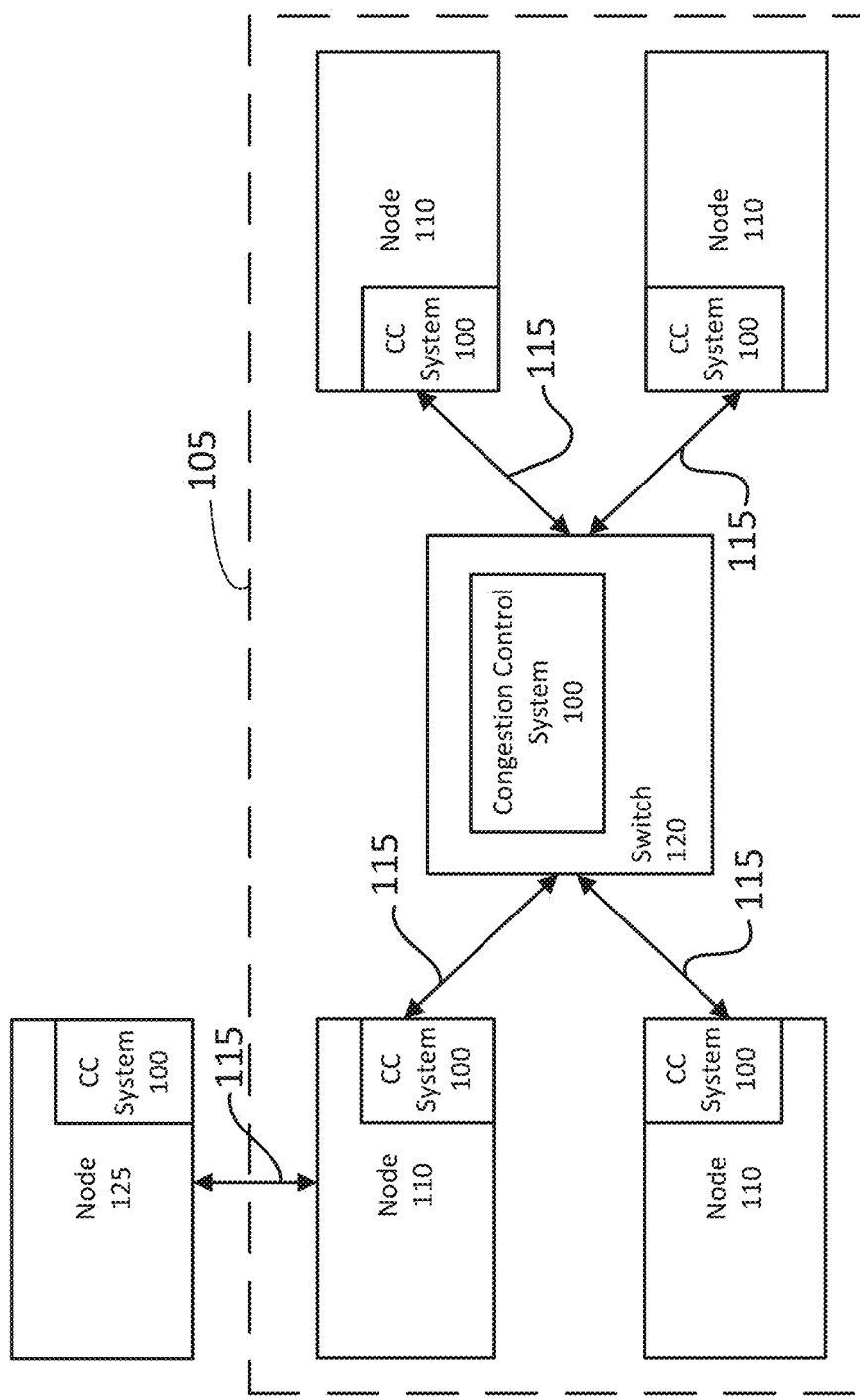
FIG. 1 is a block diagram of an example network implementing a CC system, according to aspects of the disclosure.

Aspects of the disclosure provide for congestion control mechanisms to reduce data transmission queues and to increase link utilization through precise congestion signals and reduction of control loop delay. In some implementations, a congestion control system (CC) system can utilize Back To Sender (BTS) packets over (round trip time) RTT control loop delay to react to congestion faster. Round trip time refers to the time for a sender device to send a message to a receiver device on a network and receive an acknowledgment. The CC system can apply Proactive Ramp-up (PRU) to identify flow completions to occupy released bandwidth right on time, e.g., as bandwidth is made available. A data flow ("flow") in this specification can refer to the transmission of data between nodes of a network, or between nodes within different networks. In yet other examples, the CC system can perform supply matching (SM) to increase link utilization. The CC system can apply some or all of the use of BTS packets, PRU, and/or SM to reduce network latency and improve data flow completion time as compared with other approaches.

A CC system as described herein can provide granular feedback about the location and severity of congestion on a network to avoid over- or under-reactions to congestion. The CC system can correctly receive the exact state of a bottleneck along a monitored network to correctly ramp-down during congestion and ramp-up during under-utilization. This congestion state for the bottleneck can be measured using telemetry data such as the current queue occupancy at a node in the network, and/or a measure of link utilization. Thus, nodes on the network acting as end-hosts can calculate the exact number of packets that can be injected into the network without creating congestion.

The CC system can be implemented on a network switch device ("switch"). As described in more detail herein, the CC system may access data received by the switch characterizing a network through a programmable data plane. A data plane can refer to devices of a network configured for sending and receiving network data. For example, the CC system can harness programmable switches that are part of its data plane to provide for congestion control along high line rates, with sub-RTT delay.

In addition, or alternatively, a CC system as described herein can reduce control loop delay over other approaches. The control loop refers to the identification of a congestion event, e.g., a bottleneck on the network, and the reaction from sender devices on a network arriving at the network location of the event. Control loop delay refers to the delay between the congestion event or identification of the congestion event and the reaction or actions by sender devices arriving at the network location of the event. Aspects of the disclosure provide for reducing control loop delay to sub-RTT levels.

In control loops implemented by congestion control mechanisms with delays at or longer than an RTT, a sender device sends a window of packets, observes the feedback, e.g., congestion notification, under-utilization feedback, etc., provided by the receiver over another window of packets, and adjusts the congestion window.

Congestion window refers to the maximum amount of data a device or node will send over a network at a time for a connection between two nodes. Each connection along either direction is associated with a respective congestion window. That is, a node can create multiple connections, and each connection has its own congestion window. A connection is between a pair of nodes. The same pair of nodes can also have multiple connections. Each direction of the connection has its own congestion window, e.g., each connection has two congestion windows, one per direction. As described herein, the CC system 100 can adjust congestion windows on a per connection and per direction basis.

By contrast, the CC system can use the feedback with sub-RTT delay and ramp up or down flows proactively to occupy available bandwidth. A per-packet decision or reaction can help to limit the effects of noise in the congestion signal. Through the use of switches on the network instead of end-hosts, end-hosts do not make implicit estimations about the severity and exact location of the congestion or the number of competing flows. The release from making estimations frees end-hosts from manually tuned hard-coded parameters and noisy reactions.

Aspects of the disclosure can provide for at least the following technical advantages. Data center applications, such as NVMe and distributed machine learning, can be improved through reduced latency through congestion control techniques described herein. A congestion control system as described herein can reduce control loop delay below a round trip time (RTT) on the network. By reducing control loop delay as described herein, a CC system can better monitor and address congestion on current and future networks with ever-increasing link rates, and subsequently, larger BDPs. It has been observed that even the delay of a single RTT of a congestion mechanism can be too long to tolerate for networks with increasing link speeds.

The CC system can implement a control loop at a sub-RTT between a sender node and a receiver node. Congestion can be managed more quickly and at a constant rate, as opposed to RTT-based control loops, in which the RTT between two devices can increase with congestion on a network. A congestion signal can be managed with more granularity, e.g., precise queue occupancy, for a per-packet determination of congestion control reaction. Control loop delay is also reduced by generating feedback at the congested switches and sending them directly back to send nodes. Moreover, control loop delay is reduced by proactively making decisions for foreseeable events, such as the completion of a flow.

The CC system as described herein and proactively accounts for bottlenecks or other congestion events on a network before the event occurs. The CC system can subsequently begin decrementing the congestion window for a connection between two devices, before queue occupancy reaches BDP for the one or more links on which the connection passes through. The reduced control loop timing also mitigates the reliance of congestion control mechanisms on outdated information, over approaches in which control loops are managed according to longer RTTs. The CC system is robust for a variety of different flow sizes, e.g., for different-sized flows that may be required to be transmitted through a network and potentially cause congestion. The CC system can also be implemented in networks with a combination of non-programmable and programmable switches, and in some examples be implemented alongside other end-to-end approaches for congestion control, to account for disparities in switch hardware functionality.

Example Systems

FIG. 1 is a block diagram of an example network 105 implementing a CC system 100, according to aspects of the disclosure. The CC system 100 can be at least partially implemented on one or more nodes and one or more switches of a network. For example, the CC system 100 can be implemented as part of a network interface controller or transport layer for a host node, e.g., a network-enabled computing device. The network can have any of a variety of topologies, e.g., a dumbbell topology, a star topology, etc. Components of network 105 are shown in a dashed box. Components include nodes 110, connected by links 115 to a switch 120. Node 125 represents a node outside of the network 105 in communication with nodes 110. Components of the network 105 can be implemented across one or more devices and in one or more physical locations, in various examples.

One or more links can carry one or more connections between nodes. One or more links can be wired or wireless, and example communication technologies that can be implemented by one or more links as described herein with reference to FIG. 9. In other words, each node may share multiple connections to another node. Nodes can be any form of computing device, e.g., a personal user computing device, a processor, a wearable device, a server, etc. A node may also be an intermediary device between another node and a network of devices. For example, a node may be a gateway to a different network in communication with the network through the node. Nodes on the fringes of the network 105 may be referred to as end-hosts. Data can be communicated along the one or more links according to one or more of a variety of different communication protocols, such as Transmission Control Protocol (TCP). Other example protocols which may be used include Remote Memory Direct Access over Ethernet (RoCE), QUIC, and variants of TCP or other protocols, etc.

Network switch device 120 ("switch") can be one of one or more devices on the network configured for routing network traffic internal or external to the network. The switch 120 can be at least partially programmed with the CC system 100. In some examples, the switch 120 is hardcoded to implement aspects of the CC system 100 described herein, e.g., through a combination of hardware, firmware, and/or software. The CC system 100 can be implemented on a programmable data plane of different types of switches, including switches configured to provide queue occupancy of egress ports in its ingress pipelines.

The switch 120 can collect and/or measure a variety of different types of data across a variety of different scales. For example, the switch 120 can output custom control signals to report telemetry at different scales, e.g., at the nanosecond-scale. Data received by the switch 120 can be accessed through one or more data planes, e.g., according to a predetermined interface to access data received by the switch 120 programmatically. The CC system 100 can manage flows for congestion in the network 105 without relying on end-to-end measurements for detecting congestion at a bottlenecked link. Instead, the CC system 100 can be implemented at least partially on the switch 120 for receiving precise telemetry and other data accessible through one or more data planes of the switch 120. An example programming language for programming the switch 120 is P4.

The switch 120 can implement an ingress pipeline and an egress pipeline for receiving and sending data, respectively. In addition to modifications to the pipelines according to aspects of the disclosure, the switch 120 can also implement any of a variety of features in either of the pipelines for scheduling, prioritizing, and ordering data for receiving, processing, and sending from and to various nodes of the network 105. The pipelines can be configured through software, hardware, firmware, or some combination of the preceding. Both pipelines can pass data through corresponding ingress and egress ports on the switch 120.

The control loop can be decomposed into two elements, feedback delay and observation period. The feedback delay is the time to receive any feedback, for a packet sent by a sender. The observation period is the time interval over which the feedback is collected before a congestion window is adjusted. As described presently, the CC system 100 can reduce both the feedback delay and the observation period, for example to be sub-RTT and in some examples up to an absolute minimum attainable on the network 105.

Feedback Delay

The CC system 100 can collect at least two types of feedback for use in adjusting a congestion window on a network. One type of feedback is congestion notification, and a second type of feedback is under-utilization feedback.

Congestion notification refers to when the CC system 100 receives an indication or observes that a congestion event has occurred. The definition of a congestion event can vary. For example, a congestion event can be defined as some queues in the switches growing above a predetermined threshold in excess of a predetermined rate. In some examples, a congestion event can occur if a predetermined number of packets drop at a node. The time for a receiver node to send an acknowledgment of a congestion notification to the sender node is one RTT. The CC system 100 can begin to react to a congestion event, e.g., by draining a queue for a congested node, after it has received a congestion notification. Congestion notifications can be further delayed when the notification itself is stuck in a congested queue of messages for sending from the congested node. Smaller delay in congestion notification can mitigate congestion, at least because the CC system 100 can react faster to the congestion event. The absolute minimum distance between a congested link or node and the sender node is a direct path between the two, e.g., without going through the receiver node.

The delay can also vary based on the location of the congestion event within a network. For example, in an RTT-based control loop, the delay may be higher when the congestion notification is piggybacked by a receiver device over ("receiver delay"), for example, when a network switch sends the notification directly to a sender device from an egress pipeline for the switch ("egress delay"). As yet another example, both egress delay and receiver delay may be larger than delay for when the notification is generated at the ingress pipeline of a switch ("ingress delay"), in which the notification is generated as soon as a packet arrives at the switch.

The CC system 100 addresses congestion notification delay by routing the congestion notification directly from the congestion event, e.g., a bottleneck in the network, without queuing the notification itself in a congested queue. In other words, for a congested queue of data to be sent by one or more links or node in the network experiencing a congestion event, the CC system 100 can cause the switch connecting the congested component and the sender node, and automatically notify the sender node of the congestion event, ahead of any other data transmission.

Under-Utilization Feedback

Another type of feedback the CC system 100 can use for adjusting the congestion window is under-utilization feedback of available links of a network. Flow completion and flow arrival events refer to when a flow completes and arrives on one or more links in the network. When a flow completes, on a fully utilized link, e.g., one or more links using at or near its available bandwidth, the one or more links can become under-utilized if it is also experiencing zero queuing, e.g., if the one or more links is not maintaining a standing queue of data to transmit and fill the under-utilized link. As traffic on the network becomes more dynamic, e.g., with more frequent and irregular flow complete and arrival events, the overall network utilization is reduced by these momentary link under-utilizations between the completion of an old flow and the arrival of a new flow on one or more links.

Figure 2:
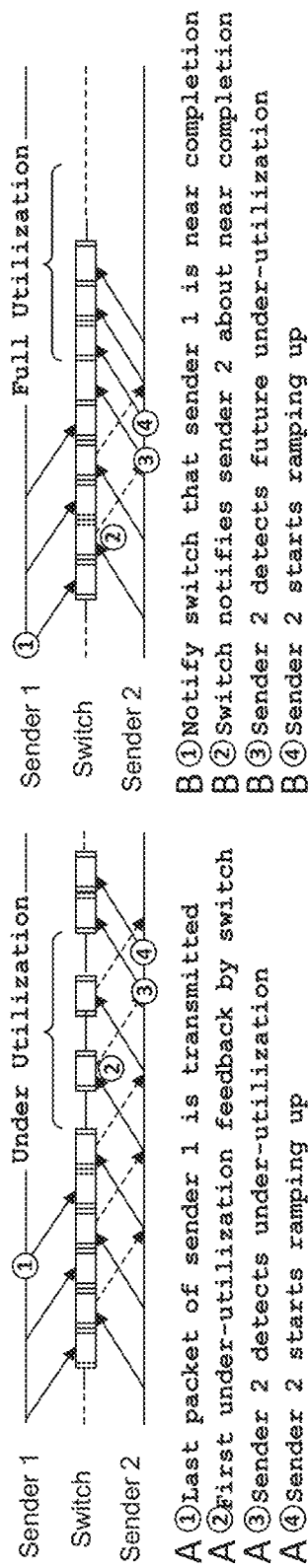
FIG. 2A shows a reactive ramp-up of one or more links when a standing queue is not maintained.
FIG. 2B shows a proactive ramp-up of one or more links when a standing queue is not maintained, according to aspects of the disclosure.

FIGS. 2A and 2B compare the reactive and proactive ramp-up of new flow arrivals following old flow completions on one or more links.

FIG. 2A shows a reactive ramp-up of one or more links when a standing queue is not maintained. Even when a standing queue is maintained, if the change in number of flows along one or more links change over time, under-utilization can still occur if the number of enqueued data transmission elements is not scaled in proportion to the change in number of flows. Also, the rate at which data transmission is increased on one or more links can also contribute to a longer under-utilization time, while the one or more links is repopulated with data from the standing queue. Managing standing queue sizes also requires balancing queue times for data stored in the standing queue before transmission. This balance can result in oscillation between queuing and under-utilization. Other approaches for restricting the reduction of a congestion window using manually tuned parameters also take longer time to stabilize over the ideal full utilization of one or more links as flows complete and start.

At point A1, the last packet of sender one is transmitted. At point A2, the first under-utilization feedback by a switch is generated. At A3, sender 2 detects under-utilization, and then at A4, starts ramping up. As indicated in FIG. 2A, there is a period of under-utilization.

FIG. 2B shows a proactive ramp-up of one or more links when a standing queue is not maintained, according to aspects of the disclosure. Aspects of the disclosure provide for a CC system configured to detect flow completions early enough to proactively ramp-up the addition of a new flow to one or more links, to reduce or eliminate under-utilization delay.

At point B1, the switch is notified by the sender 1 that it is near completion, according to aspects of the disclosure. At point B2, the switch notifies sender 2 about near completion. At point B3, sender 2 detects future under-utilization, and at point B4 starts ramping up.

Sender nodes can signal flow completion events before the event occurs, to hide the latency of ramp-up and avoid under-utilization. In this way, the CC system 100 can begin to address congestion or under-utilization before triggering congestion events, such as congested queues, occur and are identified. The CC system 100 can make congestion window adjustment decisions for received feedback on a per-packet basis.

Observation Period

In addition to feedback delay, the total control loop delay can also be impacted, e.g., by an RTT or more, for window-based data center congestion control schemes. In a window-based scheme, once the sender node adjusts its congestion window (cwnd), the next adjustment to the congestion window happens only after an RTT or more, to prevent reacting to the same congestion event multiple times. This additional delay between adjustments is referred to as the observation period.

One problem that arises in setting the observation period to at least one RTT is that it removes information about how dynamic the instantaneous load of one or more links was within the observation period. This removal of information impacts the accuracy of a CC mechanism in adjusting flows to a congested node or link. One reason the accuracy is impacted is because the sender node may receive feedback updating it on the severity of a congestion event during the observation period. Because the observation period is at a minimum one RTT, the sender node is forced to not react to the congestion event until after the period is over, causing unnecessary delay.

To address the problems described herein with respect to under-utilization and baked-in latency caused by RTT-based control loops, aspects of the disclosure provide for a CC system configured for Back to Sender (BTS)-based feedback, Proactive Ramp Up (PRU) and/or Supply Matching (SM). Using BTS-based feedback, the CC system 100 reduces congestion notification delay up to its absolute minimum. Using PRU, the CC system can virtually set zero feedback delay for foreseen under-utilization events. Using SM, the CC system can recover from unavoidable under-utilization events. In different examples, a CC system as described herein can implement some or all of BTS-based feedback, PRU, and/or SM, in different combinations.

For implementing BTS-based feedback, PRU, and/or SM, the CC system 100 can implement an example header structure, provided herein with reference to TABLE 1. The header can accompany packets of data transmitted across a network monitored and managed by the CC system 100.

TABLE 1

| 1 | header bolt_h { | | |
|---|---|---|---|
| 2 | bit <24> | queue_size; | // Occupancy at the switch |
| 3 | bit <8> | link_rate; | // Rate of congested link |
| 4 | bit <1> | data; | // Flags data packets |
| 5 | bit <1> | ack; | // Flags acknowledgements |
| 6 | bit <1> | bts; | // Flags switch feedback |
| 7 | bit <1> | last; | // Flags last wnd of flow |
| 8 | bit <1> | first; | // Flags first wnd of flow |
| 9 | bit <1> | inc; | // Signals cwnd increment |
| 10 | bit <1> | dec; | // Signals cwnd decrement |
| 11 | bit <1> | reserved; | // Reserved |
| 12 | bit <32> | t_data_tx; | // TX timestamp for data pkt |
| 13 | } | | |

TABLE 1 shows an example header with eleven fields, although the number of fields and their data types can differ from implementation-to-implementation, e.g., more, or fewer fields requiring more or fewer bits or bytes of data to store. Switches of the network at least partially implementing the CC system 100 can generate packets with a header as in TABLE 1, for example, to signal congestion.

Figure 3:
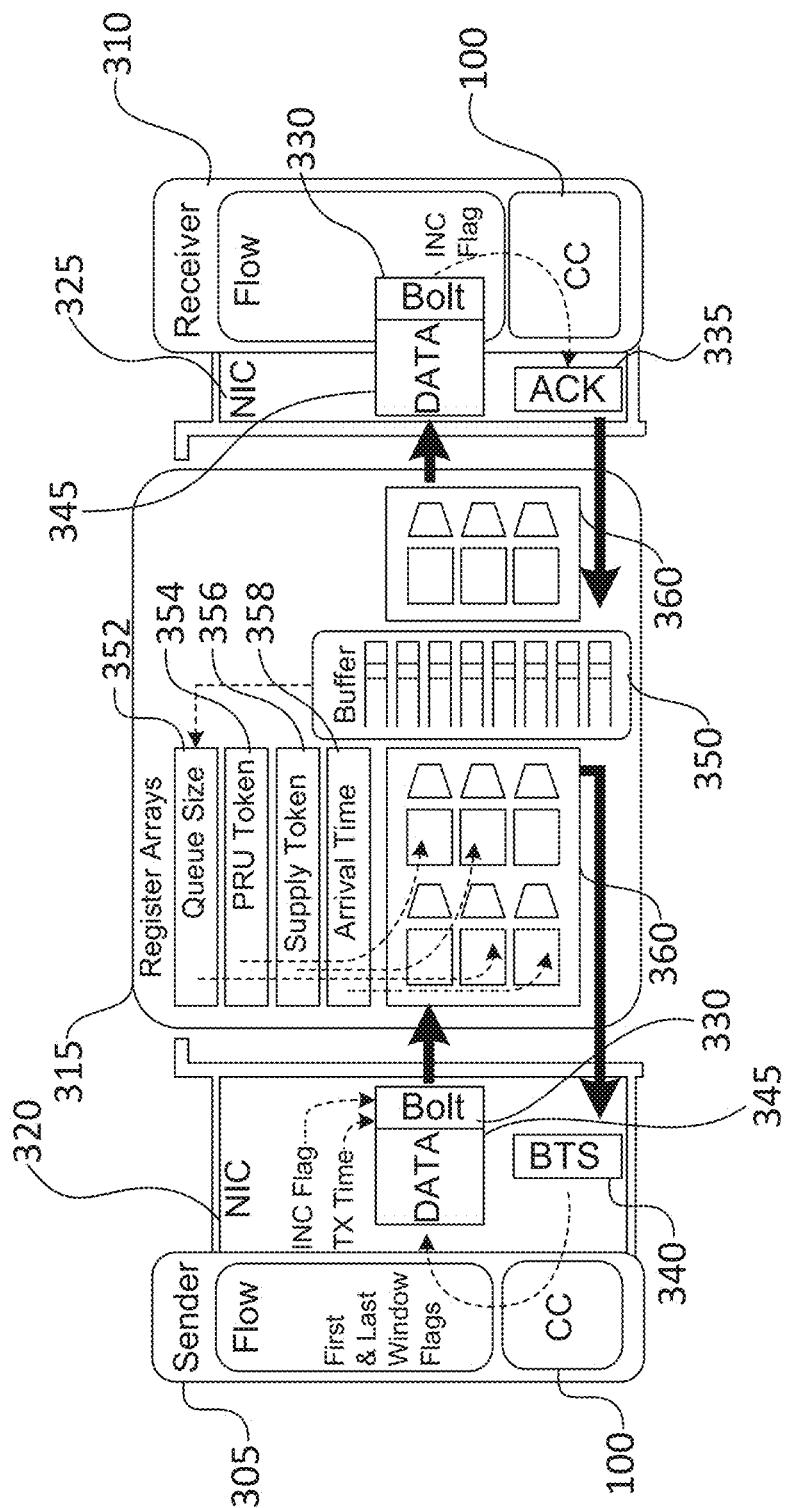
FIG. 3 is a block diagram of an example implementation of the CC system on nodes and a switch of a network, according to aspects of the disclosure.

FIG. 3 is a block diagram of an example implementation of the CC system 100 on nodes 305, 310 and a switch 315 of a network, according to aspects of the disclosure. Each of the components 305, 310, and 315 can at least partially implement the CC system 100. Nodes 305 and 310 can implement network interface controllers 320 and 325, respectively, having one or more ports for maintaining one or more connections along one or more links. As described herein, the sender node 305 can generate and send packets, e.g., packets 330, with a data payload and a header including a variety of different information, e.g., fields as described with the example header definition in TABLE 1.

The nodes 305, 310 can receive and send both regular acknowledgments 335. The nodes 305, 310 can also receive BTS-based packets 340, described in more detail herein, generated by the switch 315.

The nodes 305, 310 can generate and store flow data 345, which can include metadata attached to packets sent as part of a given flow. The metadata can include data stored in the header of each data packet, e.g., flags, such as the first and last window flags, an increment (INC) flag, a timestamp, etc.

The switch 315 can maintain a buffer 350, as well as arrays 352, 354, 356, 358 for managing different pieces of information described herein for implementing one or more of BTS-based feedback, PRU, and/or SM. For example, array 352 stores queue sizes for various queues corresponding to connections transmitting different flows. Array 354 stores PRU tokens, used as part of PRU for congestion control as described herein. Array 356 stores supply tokens as part of SM for congestion control as described herein. Array 358 stores arrival times for received packets. Queues 360 are maintained by the switch 315 for respective different connections with enqueued or dequeued packets traveling along the connection as part of a flow.

TABLE 2 shows an example algorithm implemented by a switch according to aspects of the disclosure.

TABLE 2

| 1 | Procedure BoltIngress (pkt) : |
|---|---|
| 2 | \| if !pkt.data then ForwardAndReturn(pkt); |
| 3 | \| CalculateSupplyToken(pkt); // Algorithm 3 |
| 4 | \| if cur_q_size ≥ $CC_{THRESH}$ then |
| 5 | \| \| if !pkt.dec then |
| 6 | \| \| \| $pkt_{bts}$.queue_size ← switch.q_size; |
| 7 | \| \| \| $pkt_{bts}$.link_rate ← switch.link_rate; |
| 8 | \| \| \| $pkt_{bts}$.t_data_tx ← pkt .tx_time; |
| 9 | \| \| \| SendBTS($pkt_{bts}$) |
| 10 | \| \| pkt .dec, pkt .inc ← 1, 0; |
| 11 | \| else if pkt.last then |
| 12 | \| \| if !pkt .first then pru_token+ +; |
| 13 | \| else if pkt.inc then |
| 14 | \| \| if pru_token > 0 then |
| 15 | \| \| \| pru_token ← pru_token − 1; |
| 16 | \| \| else if sm_token ≥ MTU then |
| 17 | \| \| \| sm_token ← sm_token − MTU; |
| 18 | \| \| else |
| 19 | \| \| \| pkt .inc ← 0; |
| 20 | \| ForwardAndReturn(pkt); |

Back-To-Sender (BTS)-Based Feedback

Figure 4:
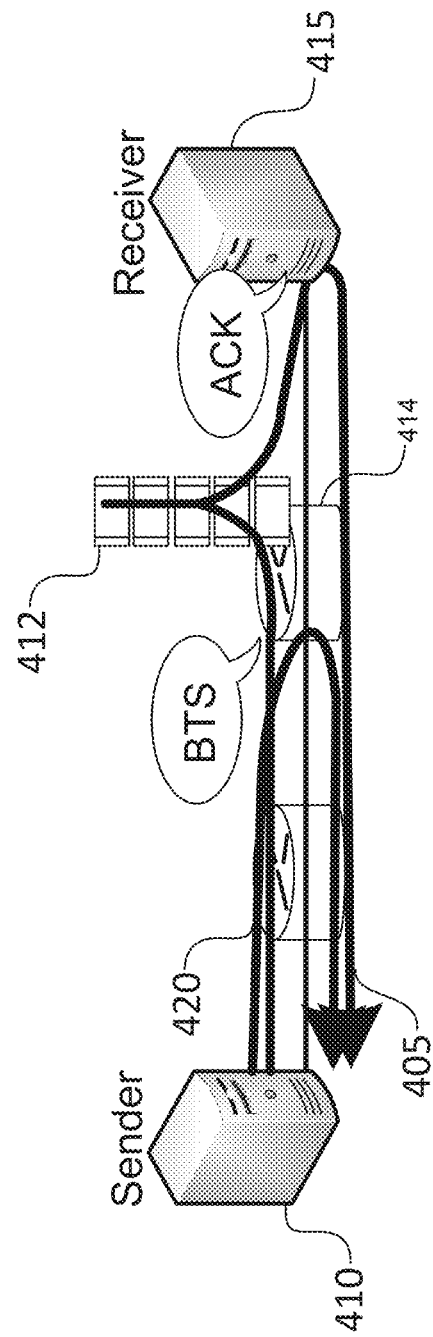
FIG. 4 is a block diagram contrasting acknowledgment-based versus BTS-based feedback.

FIG. 4 is a block diagram contrasting acknowledgment-based versus BTS-based feedback. The ACK loop 405 starts from sender node 410 sending a packet that is enqueued in queue 412 at switch 414. The receiver node 415 sends an acknowledgment back to the sender node 410. By contrast, using BTS-based feedback, the BTS loop 420 is the shortest possible path between switch 414 between the sender node 410 and the receiver node 415, and the sender node 410. BTS-based packets are also prioritized over other packets in the queue 410, to further reduce feedback delay.

The CC system 100 can generate a BTS-based packet for every data packet that arrives while the queue occupancy at the switch is greater than or equal to a predetermined threshold, e.g., $CC_{THRESH}$ in the algorithm shown with respect to TABLE 1. The predetermined threshold can be a maximum transmission unit (MTU) for a given link. To prevent multiple switches along one or more links from generating a BTS-based packet, the first time a switch generates a BTS-based packet for a received data packet, the switch can set a flag, e.g., the DEC flag as shown in TABLE 1. When this flag is set, subsequent switches along the one or more links will not generate another BTS-based packet for that same packet, e.g., as shown for example in lines 5 and 10 in the algorithm as shown in TABLE 1. By eliminating duplicate BTS-based packets, the CC system 100 manages at most a number of BTS-based packets equal to the number of data packets in the network at a time. The introduction of BTS-based packets is negligible on network performance, at least because of the size of the packets and quantity of packets not exceeding the number of data packets in transmission on the network, e.g., because no more than one BTS-based packet is generated for a data packet.

To generate the BTS-based packet, the switch can mirror a data packet to its input port or connection, while forwarding the original packet along the one or more links. The mirror configuration may be determined using a lookup table, which matches the ingress port of the packet and selects the associated mirroring session. The CC system 100 as implemented on the switch can be configured to trim the mirrored packet to remove the payload. The source/destination addresses, ports, and flow identifiers can be swapped. The CC system 100 can set a flag in a custom header, e.g., defined as shown in TABLE 1, to indicate that the packet is a BTS-based packet.

The effect of a BTS-based packet can be the same for all switches, e.g., causing a congestion window for the switch to decrement by one or more packet sizes. If there are multiple congested switches, the sender device receives BTS-based packets for congestion caused by a first flow but decrementing the congestion window for connections corresponding to each flow helps mitigate congestion across all flows.

A switch generating BTS-based packets as described herein can add additional metadata to a header stamped with the current queue occupancy of the switch, and the capacity of the one or more links as a measure of how severe the congestion is. When a sender device from which the original data packet was sent receives a corresponding BTS-based packet, it can run decision logic for adjusting a congestion window for a corresponding connection, as described for example in the algorithm with reference to TABLE 2.

In some examples, the CC system 100 can, in addition to performing congestion window adjustments at a sub-RTT delay, continue to also provide congestion window adjustments at once per RTT.

TABLE 3 shows an example algorithm for how sender devices at least partially implementing the CC system 100 can be configured to handle congestion window adjustment.

TABLE 3

Algorithm 2: Bolt logic at the sender host

| 1 | Function HandleBts ($pkt_{bts}$): |
|---|---|
| 2 | \| $rtt_{bts}$ = now − pkt.t_tx_data |
| 3 | \| reaction_factor = flow.rate / $pkt_{bts}$.link_rate |
| 4 | \| $target_q$ = $pkt_{bts}$.queue_size × reaction_factor |
| 5 | \| // $target_q$ in # of packets |
| 6 | \| if $\dfrac{rtt_{bts}}{target_q}$ ≤ now − last_dec_time then |
| 7 | \| \| cwnd ← cwnd − 1 |
| 8 | \| \| last_dec_time = now |
| 9 | Function HandleAck ($pkt_{ack}$): |
| 10 | \| if $pkt_{ack}$.inc then |
| 11 | \| \| cwnd ← cwnd + 1 |
| 12 | \| if $pkt_{ack}$.seq_no ≥ seq_no_at_last_ai then |
| 13 | \| \| cwnd ← cwnd + 1  // per-RTT add. inc. |
| 14 | \| \| seq_no_at_last_ai = snd_next |

First, $rtt_{bts}$ is calculated as shown in line 2. $rtt_{bts}$ is the time between transmitting the corresponding data packet and receiving a corresponding BTS-based packet. This is the congestion notification delay calculated by the CC system 100, which is shorter than the RTT between a sender and receiver device. Next, reaction_factor is calculated, which is a factor measuring how much time a given flow from which a packet is received is responsible for the current congestion. Switches configured according to aspects of the disclosure can generate BTS-based packets irrespective of the flows when there is congestion. An example calculation of this factor is shown in line 3. Multiplying the factor (reaction_factor) by the calculated RTT ($rtt_{bts}$) yields the target amount of queuing to be drained for the given flow. The target queue ($target_q$) is the target queue size for the sender node, which the sender node can increment or decrement. As all flows aim to drain only what they are responsible for, e.g., contributing to the congestion at the one or more links, fairness is also maintained.

$$\frac{rtt_{bts}}{target_q}$$

is calculated to find the smallest time interval between two consecutive decisions by a sender device. Determining this interval of time prevents over-reaction due to the switch sending congestion notifications until the effect of the sender node's congestion window changes propagates to a downstream switch. Therefore, for example, if the target queue is 1 packet, the sender node should only decrement its congestion window when it has not done so in the last $rtt_{bts}$. However, if the queue is longer, the sender node can perform more frequent decrements or increments, guaranteeing, for example, to have a total decrease equal to the target queue size in one $rtt_{bts}$.

Figure 5:
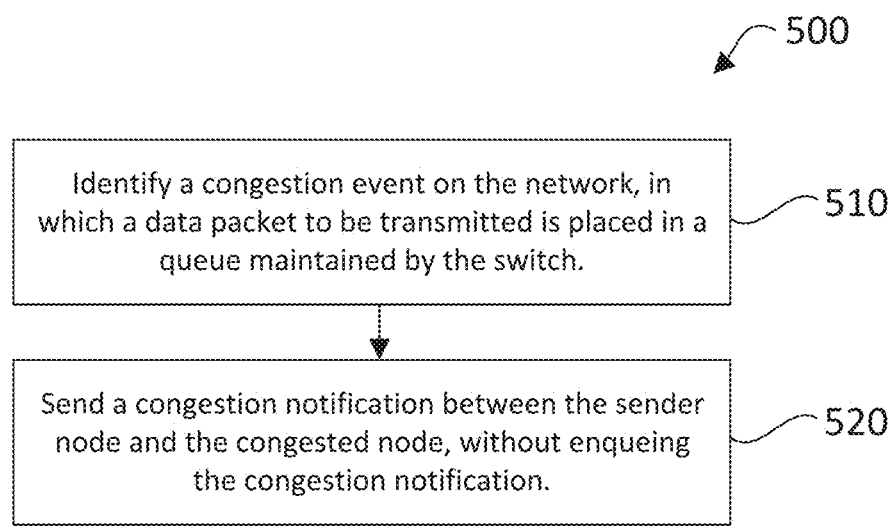
FIG. 5 is a flow diagram of an example process of BTS-based feedback congestion control, according to aspects of the disclosure.

FIG. 5 is a flow diagram of an example process 500 of BTS-based feedback congestion control, according to aspects of the disclosure. The switch performing the process 500 can provide BTS-based feedback congestion to a sender node appropriately configured with the CC system, e.g., as described herein with reference to Algorithm 2 in TABLE 3 and in the process 600 of FIG. 6, herein.

A switch at least partially implementing a CC system identifies a congestion event on the network, in which a data packet to be transmitted is placed in a queue maintained by the switch, according to block 510. As described herein with reference to BTS-based feedback, the CC system can identify congestion events, such as bottlenecks, based on comparisons of network traffic relative to different thresholds, e.g., a threshold response time, a threshold queue time, etc.

The switch sends a congestion notification between the sender node and the congest node, without enqueuing the congestion notification, according to block 520. The switch can send the congestion notification to the sender node. As shown in FIG. 4, the BTS loop 420 is shorter than the ACK loop 405, allowing for a faster notification to the sender node 410 of congestion. Further, by not enqueuing the congestion notification on a queue maintained by the switch, e.g., switch 410 in FIG. 4, the congestion notification itself is not delayed by the congestion being reported.

In some examples, the switch receives a data packet, and determines that a receiver node of the packet is experiencing a congestion event, e.g., the congest node. In response, the switch generates the congestion notification at the switch, and sends the notification from the switch to the sender node, e.g., the BTS loop 420 of FIG. 4.

In some examples, the one or more links between the sender node and the congested node in the network includes multiple switches. Only one congestion notification from one of the multiple switches may be sent, instead of multiple notifications for the same congestion event. As described with reference to BTS-based feedback, the multiple switches can check the status of a dedicated flag on a packet to determine whether a corresponding congestion notification for the packet has been sent by an upstream node.

In some examples, each of the switches along the one or more links is associated with one or more respective congestion windows. These congestion windows can each be associated with a respective connection between the switch and the sender node maintained within the one or more links. Switches along the one or more links can decrement each congestion window by one or more packet sizes, in response to the congestion event.

Figure 6:
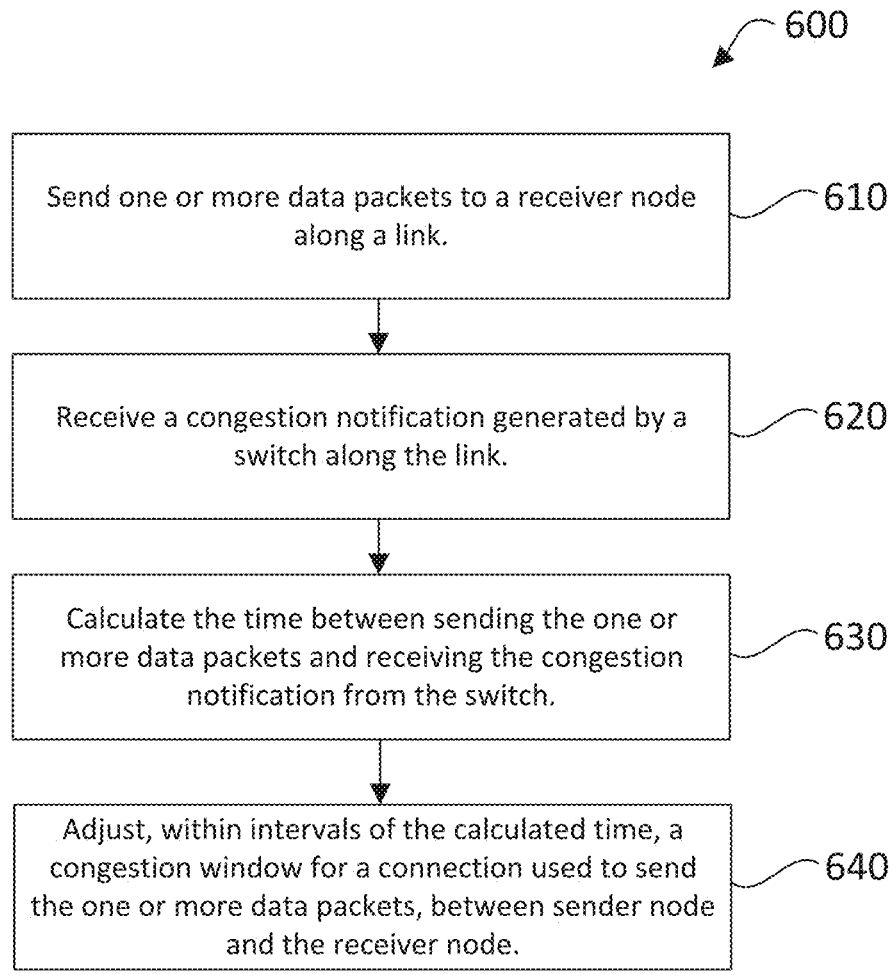
FIG. 6 is a flow diagram of another example process of BTS-based feedback for congestion control, according to aspects of the disclosure.

FIG. 6 is a flow diagram of another example process 600 of BTS-based feedback for congestion control, according to aspects of the disclosure.

A sender node sends one or more data packets to a receiver node along one or more links, according to block 610.

The sender node receives a congestion notification generated by a switch along the one or more links, according to block 620. As described herein with reference to FIGS. 4-5, the congestion notification can be generated by a switch along the one or more links, for example according to a BTS-based feedback loop.

The sender node calculates the time between sending the one or more data packets and receiving the congestion notification from the switch, according to block 630. As described herein with reference to TABLE 3, the sender node can calculate the $rtt_{bts}$. The calculated time can be less than the round trip time for sending data and receiving an acknowledgment between the sender node and receiver node, e.g., the difference between the ACK loop and the BTS loop as shown in FIG. 4.

The sender node adjusts, within intervals of the calculated time, a congestion window for a connection used to send the one or more data packets between the sender node and the receiver node, according to block 640. As described herein with reference to TABLE 3, the congestion window can be incremented or decremented according to a calculated target queue size.

In some examples, one or more data flows are transmitted along the one or more links, including a first flow with packets sent by the sender node to the receiver node. The sender node can further calculate a factor measuring the proportion to the one or more links that the first flow contributes over the total amount of congestion on the one or more links. For example, the sender node can calculate the reaction_factor as described with reference to TABLE 3. The sender node can receive the current queue occupancy for a queue of data maintained at the switch. Based at least on the factor, the current occupancy, and the calculated time, the sender node can adjust the congestion window, e.g., with the function HandleAck as shown in TABLE 3.

Proactive Ramp Up (PRU)

In addition to notifying sender nodes about congestion, under-utilization events are also worth notifying for occupying the available bandwidth. Aspects of the disclosure provide for a greedy approach to detect available bandwidth at a potential bottleneck before data packets are sent. Referring to the example header structure as shown in FIG. 1, sender nodes set the INC flag on the packet. A switch along the one or more links to a receiver node can receive the flagged data packet. Each switch can maintain a number of tokens corresponding to available bandwidth. When a switch receives the data packet and has tokens denoting available bandwidth, the switch maintains the flag on the packet and consumes a token. Otherwise, the switch clears the flag on the data packet, preventing future switches from consuming tokens for the packet.

If no switch clears the flag along the one or more links to a receiver node, then that is an indication that the one or more links has enough bandwidth to accommodate an extra packet. On the other hand, if the greedy approach results in a waste of tokens on earlier switches, e.g., due to congestion on downstream switches, the CC system 100 may apply additive increases to the congestion window, instead.

Flow completion time may be known in advance. For example, when a remote procedure call (RPC) is initiated from a sender node, the amount of data that will be transferred is declared to the network stack of the sender node. An RPC may include multiple data packets for transferring. The sender node can embed this timing information as a field in a header of the transmitted sender node, e.g., a header as defined in TABLE 1. This additional information informs a receiving switch about when a flow completion event is expected, so that switches on one or more links holding the connection between sender node and receiver node can plan ahead to distribute the bandwidth of the completing flow to the remaining flows on the one or more links.

The CC system 100 as described herein mitigates or prevents under-utilization by proactively ramping up remaining flows. A switch on a flow keeps track of how many packets it has seen so far that belong to a completing flow, which may be referred to as PRU tokens for ease of description. The switch marks a corresponding number of packets from non-completing flows, allowing remaining flows to increase their congestion window at their respective sender nodes when the completing flow finishes. For example, referring to FIG. 2B, sender 2 is notified through packets of its non-competing flow of the upcoming completion of the flow from sender 1, allowing it to ramp up without waiting for an under-utilization notification from the switch.

RPCs that are shorter than 1 BDP on one or more links may not be accounted for PRU purposes. When a new RPC begins, the congestion window of its corresponding connection is not expected by the network, creating extra load. Therefore, a receiving switch should not expect those packets to be replaced by packets of other flows, once the packets leave the network. The CC system 100 can prevent or mitigate this issue by setting a particular flag, e.g., the FIRST flag as defined in the header definition shown in TABLE 1, on packets that are in the first congestion window for the RPC. Thus, downstream switches check against the FIRST flag on packets before incrementing the PRU token value, for example as shown in line 12 of the algorithm as shown in TABLE 3.

When a longer flow, e.g., a flow longer than one BDP, starts sending its last congestion window worth of data, a receiving switch sets another flag on the packets, e.g., the LAST flag as defined in TABLE 1. A switch receiving a packet with this set flag, given that the switch is not already congested, increments the PRU token value associated with an egress port of the packet. When a packet without the LAST flag set arrives, a receiving switch, given that it is still not congested, decrements the PRU token value and keeps the INC flag on the packet, for example as shown in lines 13-15 of the algorithm as shown in TABLE 3. PRU can be implemented with or without BTS-based feedback, according to various examples.

Figure 7:
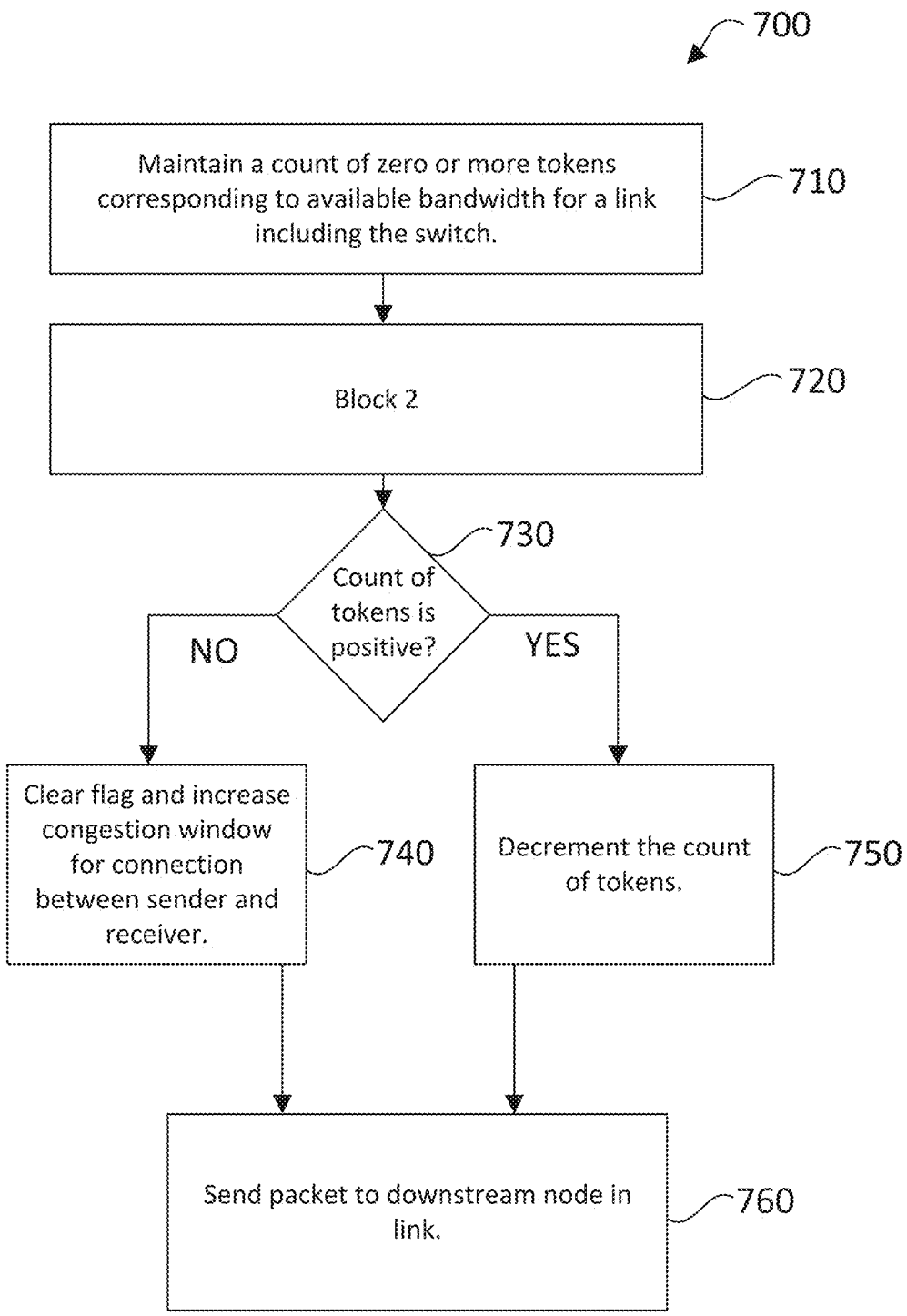
FIG. 7 is a flow diagram of an example process for performing PRU for congestion control, according to aspects of the disclosure.

FIG. 7 is a flow diagram of an example process 700 for performing PRU for congestion control, according to aspects of the disclosure.

A switch maintains a count of zero or more tokens, e.g., PRU tokens, corresponding to available bandwidth for one or more links including the switch, according to block 710.

The switch receives a data packet including a header with a set flag, the data packet received from a sender node to be transmitted to a receiver node along the one or more links, according to block 720. The set flag can refer to a flag described herein for determining whether or not the data packet is part of a completing flow.

The switch determines whether the count of tokens is positive, according to decision block 730. If no ("NO"), the switch clears the set flag and increases the congestion window for the connection between the sender node and the receiver node, according to block 740. Otherwise ("NO"), the switch decrements the current token count, according to block 750. The switch sends the packet to a downstream node or switch in the one or more links, according to block 760.

Supply Matching

Flow completion is not the only cause for under-utilization of one or more links. Events like link and device failures, and routing changes can also result in idle or under-utilized links. These events are highly dynamic and often unpredictable, and as described above congestion control based on an RTT-based control loop is slow to react. In addition, RTT-based control loops may take even longer to respond as RTT increases with congestion.

Aspects of the disclosure provide for leveraging stateful operations in programmable switches to measure instantaneous utilization on one or more links. Unlike flow completions with respect to PRU, events such as link failure or routing changes are not hinted in advance, so supply matching can be used instead to capture available bandwidth.

When supply matching is enabled on the CC system 100, each switch at least partially implementing the system can keep track of the mismatch between supply and demand for the one or more links capacity for each connection, e.g., along a port of the switch, maintained by the switch. The number of bytes the switch can serialize in unit time is the "supply" amount for the one or more links. The number of bytes that arrived in the same time interval is the "demand" amount for the one or more links. If the demand is larger than the supply, congestion takes place. Otherwise, the one or more links is under-utilized.

When a packet arrives at a switch, the switch can calculate the new supply token value associated with an egress port for the switch. This token value measures the mismatch between the supply and demand in bytes. Negative values of the token indicate queuing whereas a positive value means under-utilization. If the final token is above 1 MTU, the switch keeps the INC flag on the packet to let the sender inject an extra packet into the network, as shown in lines 16-17 of the algorithm of TABLE 2. MTU is decremented from the supply token value at this point to account for future demand Otherwise, subsequent packets arriving at the switch could also observe high token values and end up getting an excess amount of INC flags collectively. Offloading this calculation to the switches of the network to capture utilization data such as the mismatch between supply and demand on a per-packet basis.

TABLE 4 shows an algorithm for calculating a supply token on the ingress pipeline for each port on a switch at least partially implementing the CC system 100.

TABLE 4

Algorithm 3: Supply Token calculated on the ingress pipeline for each egress port at the switch

| | |
|---|---|
| 1 | Function CalculateSupplyToken (pkt) : |
| 2 |    inter_arrival_time ← now − last_sm_time |
| 3 |    last_sm_time ← now |
| 4 |    supply ← BW × inter_arrival_time |
| 5 |    demand ← pkt .size |
| 6 |    sm_token ← sm_token + supply − demand |
| 7 |    sm_token ← min (sm_token, MTU) |

Figure 8:
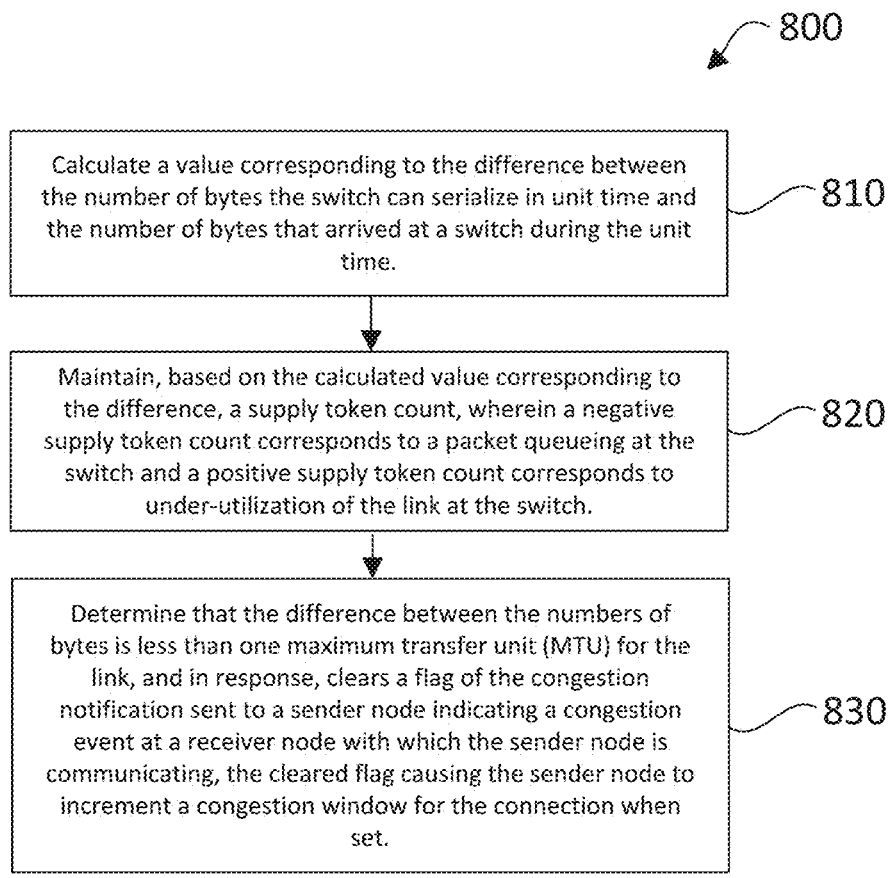
FIG. 8 is a flow diagram of an example process for supply matching for congestion control, according to aspects of the disclosure.

FIG. 8 is a flow diagram of an example process 800 for supply matching for congestion control, according to aspects of the disclosure.

A switch calculates a value corresponding to the difference between the number of bytes the switch can serialize in unit time and the number of bytes that arrived at a switch during the unit time, according to block 810.

The switch maintains, based on the calculated value corresponding to the difference, a supply token count, wherein a negative supply token count corresponds to packet queueing at the switch and a positive supply token count corresponds to under-utilization of the one or more links at the switch, according to block 820.

According to block 830, the switch determines that the difference between the numbers of bytes is less than one maximum transfer unit (MTU) for the one or more links, and in response, clears a flag of the congestion notification sent to a sender node indicating a congestion event at a receiver node with which the sender node is communicating, the cleared flag causing the sender node to increment a congestion window for the connection when set.

Example Computing Environment

Figure 9:
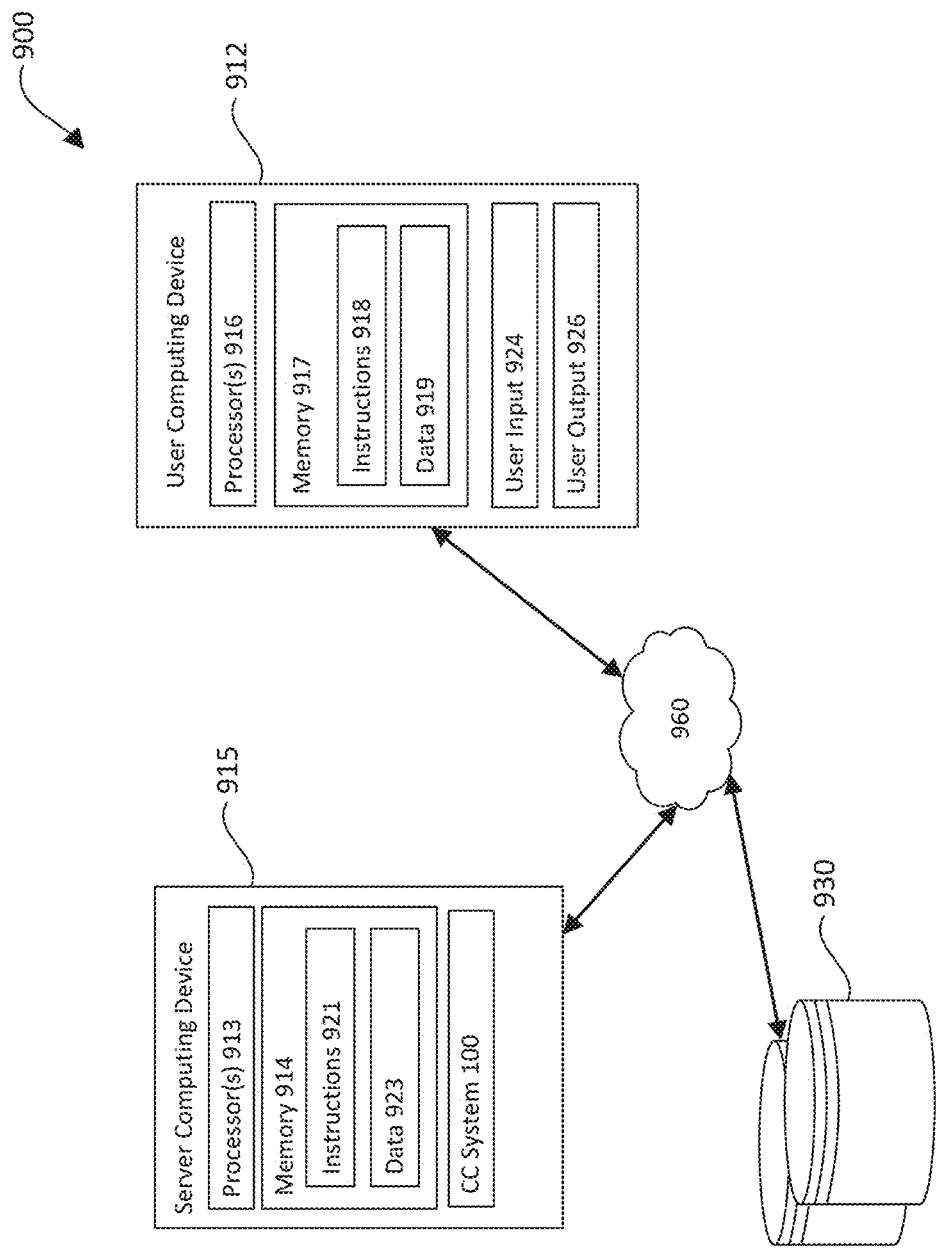
FIG. 9 is a block diagram of an example environment for implementing the CC system.

FIG. 9 is a block diagram of an example environment 900 for implementing the CC system 100. The system 400 can be implemented on one or more devices having one or more processors in one or more locations, such as in server computing device 915. User computing device 912 and the server computing device 915 can be communicatively coupled to one or more storage devices 930 over a network 960. The storage device(s) 930 can be a combination of volatile and non-volatile memory, and can be at the same or different physical locations than the computing devices 912, 915. For example, the storage device(s) 930 can include any type of non-transitory computer readable medium capable of storing information, such as a hard-drive, solid state drive, tape drive, optical storage, memory card, ROM, RAM, DVD, CD-ROM, write-capable, and read-only memories. The example devices described herein can at least partially form a node as described herein with reference to FIG. 1.

The server computing device 915 can include one or more processors 913 and memory 914. The memory 914 can store information accessible by the processor(s) 913, including instructions 921 that can be executed by the processor(s) 913. The memory 914 can also include data 923 that can be retrieved, manipulated or stored by the processor(s) 913. The memory 914 can be a type of non-transitory computer readable medium capable of storing information accessible by the processor(s) 913, such as volatile and non-volatile memory. The processor(s) 913 can include one or more central processing units (CPUs), graphic processing units (GPUs), field-programmable gate arrays (FPGAs), and/or application-specific integrated circuits (ASICs), such as tensor processing units (TPUs).

The instructions 921 can include one or more instructions that when executed by the processor(s) 913, causes the one or more processors to perform actions defined by the instructions. The instructions 921 can be stored in object code format for direct processing by the processor(s) 913, or in other formats including interpretable scripts or collections of independent source code modules that are interpreted on demand or compiled in advance. The instructions 921 can include instructions for implementing the system 100 consistent with aspects of this disclosure. The system 100 can be executed using the processor(s) 913, and/or using other processors remotely located from the server computing device 915.

The data 923 can be retrieved, stored, or modified by the processor(s) 913 in accordance with the instructions 921. The data 923 can be stored in computer registers, in a relational or non-relational database as a table having a plurality of different fields and records, or as JSON, YAML, proto, or XML documents. The data 923 can also be formatted in a computer-readable format such as, but not limited to, binary values, ASCII or Unicode. Moreover, the data 923 can include information sufficient to identify relevant information, such as numbers, descriptive text, proprietary codes, pointers, references to data stored in other memories, including other network locations, or information that is used by a function to calculate relevant data.

The user computing device 912 can also be configured similar to the server computing device 915, with one or more processors 916, memory 917, instructions 918, and data 915. The user computing device 912 can also include a user output 926, and a user input 924. The user input 924 can include any appropriate mechanism or technique for receiving input from a user, such as keyboard, mouse, mechanical actuators, soft actuators, touchscreens, microphones, and sensors.

The server computing device 915 can be configured to transmit data to the user computing device 912, and the user computing device 912 can be configured to display at least a portion of the received data on a display implemented as part of the user output 926. The user output 926 can also be used for displaying an interface between the user computing device 912 and the server computing device 915. The user output 926 can alternatively or additionally include one or more speakers, transducers or other audio outputs, a haptic interface or other tactile feedback that provides non-visual and non-audible information to the platform user of the user computing device 912.

Although FIG. 9 illustrates the processors 913, 916 and the memories 914, 917 as being within the computing devices 915, 912, components described in this specification, including the processors 913, 916 and the memories 914, 917 can include multiple processors and memories that can operate in different physical locations and not within the same computing device. For example, some of the instructions 921, 918 and the data 923, 915 can be stored on a removable SD card and others within a read-only computer chip. Some or all of the instructions and data can be stored in a location physically remote from, yet still accessible by, the processors 913, 916. Similarly, the processors 913, 916 can include a collection of processors that can perform concurrent and/or sequential operation. The computing devices 915, 912 can each include one or more internal clocks providing timing information, which can be used for time measurement for operations and programs run by the computing devices 915, 912.

The server computing device 915 can be configured to receive requests to process data from the user computing device 912. For example, the environment 900 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 912 may receive and transmit data specifying target computing resources to be allocated for executing a neural network trained to perform a particular neural network task.

The devices 912, 915 can be capable of direct and indirect communication over the network 960. The devices 915, 912 can set up listening sockets that may accept an initiating connection for sending and receiving information. The network 960 itself can include various configurations and protocols including the Internet, World Wide Web, intranets, virtual private networks, wide area networks, local networks, and private networks using communication protocols proprietary to one or more companies. The network 960 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 960, in addition or alternatively, can also support wired connections between the devices 912, 915, including over various types of Ethernet connection.

Although a single server computing device 915 and user computing device 912 are shown in FIG. 9, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A method for congestion control on a network of, the method comprising:
   sending, by a sender node comprising one or more processors, one or more data packets to a receiver node along one or more links;
   receiving, by the sender node, a congestion notification generated by a switch along the one or more links;
   calculating, by the sender node, the time between sending the one or more data packets and receiving the congestion notification from the switch; and
   adjusting, by the sender node and within the calculated time, a congestion window for a connection between the sender node and the receiver node used to send the one or more data packets;
   wherein one or more data flows are transmitted along the one or more links, including a first flow comprising the one or more data packets sent by the sender node to the receiver node, and wherein the method further comprises:
      calculating a factor measuring the proportion of the congestion to the one or more links that the first flow contributes over the total amount of congestion on the one or more links;
      receiving the current queue occupancy for a queue of data maintained at the switch; and
      adjust the congestion window based at least on the factor, the current queue occupancy, and the calculated time.

2. The method of claim 1, wherein the calculated time is less than the round trip time for sending data and receiving an acknowledgment between the sender node and the receiver node.

3. The method of claim 1, wherein the method further comprises adjusting the congestion window for the connection only once per calculated time interval.

4. The method of claim 1, wherein the method further comprises:
   generating, by the sender node, a header for a data packet of a plurality of data packets, the header comprising a first flag indicating that the data packet is an initial data packet transmitted of the plurality of data packets, and further comprising data specifying the amount of data to be transferred in the plurality of data packets; and transmitting, by the sender node, the plurality of data packets to the switch.

5. A method of congestion control on a network, the method comprising:
maintaining, by a switch comprising one or more processors, a count of zero or more tokens corresponding to available bandwidth for one or more links comprising the switch;
receiving, by the one or more processors, a data packet comprising a header with a set flag, the data packet received from a sender node to be transmitted to a receiver node along the one or more links;
determining, by the one or more processors, whether the count of tokens is positive,
in response to determining that the count of tokens is positive, decrement the count of tokens, and
in response to determining that the count of tokens is not positive, clearing the flag and increasing a congestion window for a connection between a sender node and the switch; and
sending, by the one or more processors, the data packet to a downstream node in the one or more links.

6. The method of claim 1, further comprising:
maintaining, by a switch comprising one or more processors, a count of zero or more tokens corresponding to available bandwidth for the one or more links comprising the switch;
receiving, by the switch, a data packet comprising a header with a set flag;
determining, by the switch, whether the count of tokens is positive,
in response to determining that the count of tokens is non-zero, decrement the count of tokens, and
in response to determining that the count of tokens is zero, clearing the flag and increasing a congestion window for a connection between the sender node and the one or more processors; and
sending, by the switch, the data packet to a downstream node in the one or more links.

7. The method of claim 6, further comprising:
maintaining, by the switch, a count of packets received corresponding to a first flow of data over the connection;
receiving, by the switch, a data transfer quantity indicating the total amount of data to transmit in the first flow;
calculating, by the switch and based at least on the received data transfer quantity, an estimated time for the completion of the first flow; and
at or after the estimated time for the completion of the first flow, increasing, by the switch, respective congestion windows for connections for one or more other flows along the one or more links different from the first flow.

8. The method of claim 7,
wherein received data packets form part of a remote procedure call (RPC) from the sender node, and
wherein the method further comprises:
receiving, by the switch, a flag in a header of a first packet of the received data packets indicating whether the first packet is an initial packet transmitted as part of the RPC, wherein the received data packets of the RPC are collectively smaller in size than a bandwidth delay product (BDP) for the one or more links; and
increasing, by the switch, the count of tokens only when the flag indicating that the first packet is an initial packet is cleared.

9. The method of claim 6, wherein the method further comprises:
receiving, by the switch, a flag in a header of a second packet of the received data packets indicating that the second packet is the last packet transmitted of the RPC; and
incrementing the count of tokens when the flag in the header of the second packet is set, otherwise decrementing the count of tokens.

10. The method of claim 1, wherein the method further comprises:
calculating, by the switch, a value corresponding to the difference between the number of bytes the switch can serialize in unit time and the number of bytes that arrived at the switch during the unit time;
maintaining, by the switch and based on the calculated value corresponding to the difference, a supply token count, wherein a negative supply token count corresponds to packet queueing at the switch and a positive supply token count corresponds to under-utilization of the one or more links at the switch;
determining, by the switch, that the difference between the numbers of bytes is less than one maximum transfer unit (MTU) for the one or more links, and in response, clearing a flag of the congestion notification sent to the sender node, the cleared flag causing the sender node to increment a congestion window for the connection when set.

11. The method of claim 10, wherein the method further comprises decrementing, by the switch, the MTU of the one or more links from the supply token value.

12. The method of claim 5, wherein the data packet of the plurality of data packets is a first data packet, and wherein the method further comprises:
generating, by the one or more processors, a header for a second data packet of the plurality of data packets, the header comprising a second flag indicating that the second data packet is the last packet of the plurality of data packets; and
transmitting, by the one or more processors, the second data packet.

13. A method for congestion control on a network, the method comprising:
calculating, by a switch comprising one or more processors, a value corresponding to the difference between the number of bytes the switch can serialize in unit time and the number of bytes that arrived at the switch during the unit time;
maintaining, by the switch and based on the calculated value corresponding to the difference, a supply token count, wherein a negative supply token count corresponds to packet queueing at the switch and a positive supply token count corresponds to under-utilization of the one or more links at the switch;
determining, by the switch, that the difference between the numbers of bytes is less than one maximum transfer unit (MTU) for the one or more links, and in response, clearing a flag of the congestion notification sent to a sender node indicating a congestion event at a receiver node with which the sender node is communicating, the cleared flag causing the sender node to increment a congestion window for the connection when set.

* * * * *